Feb. 21, 1939.   J. G. KASPICK   2,148,074
FISHHOOK
Filed Sept. 8, 1937

Jack G. Kaspick
INVENTOR
BY Victor J. Evans & Co.
ATTORNEYS

Patented Feb. 21, 1939

2,148,074

UNITED STATES PATENT OFFICE 2,148,074

FISHHOOK

Jack G. Kaspick, Tyrone, Pa.

Application September 8, 1937, Serial No. 162,924

1 Claim. (Cl. 43—40)

This invention relates to fish hooks and has for an object to provide a fish hook having spring shanks of different lengths upon one of which shanks a minnow is adapted to be impaled lengthwise and bear upon both shanks hooked together to maintain the minnow in natural position in the water and prevent escape of the minnow during a cast or during a strike.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1:
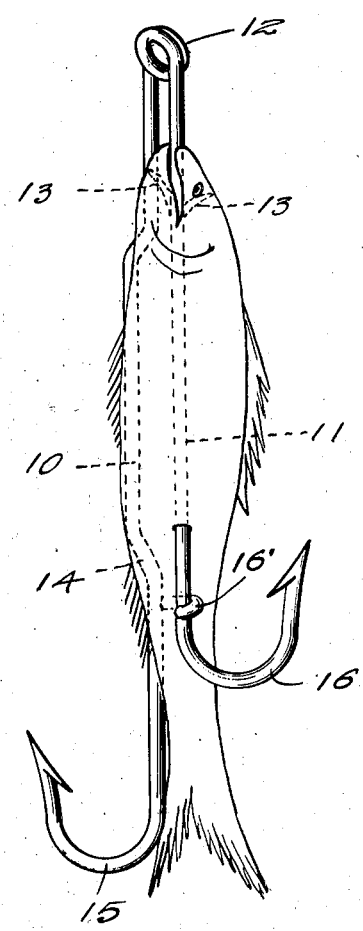
Figure 1 is a perspective view of a fish hook constructed in accordance with the invention and shown in closed position to support a minnow.
Figure 2:
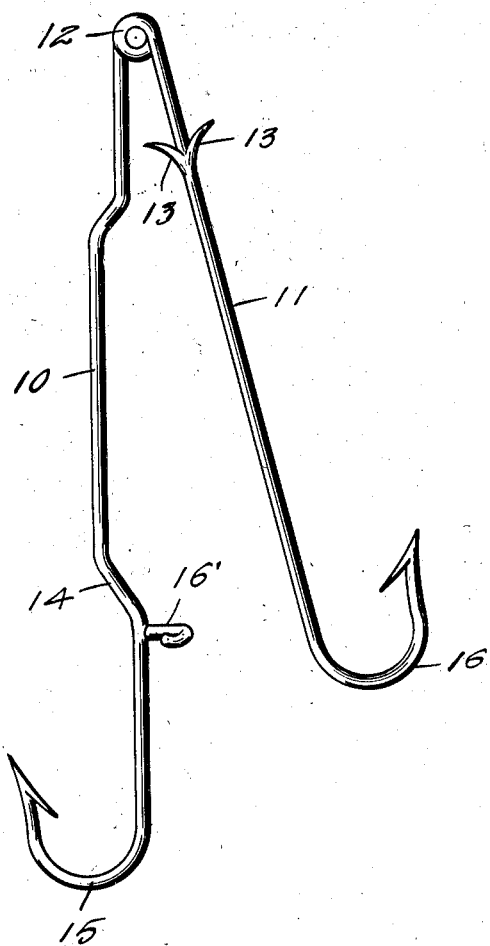
Figure 2 is a side elevation of a fish hook in open position.

Referring now to the drawing in which like characters of reference designate similar parts in the various views, the minnow hook comprises two shanks 10 and 11 of different lengths connected together by an integral coil spring 12. The shorter shank is provided near the coil spring with laterally directed barbs 13 with which the mouth of the minnow is engaged. One of the barbs is located directly opposite the longer shank 10 and is in contact with it when said shank is latched to the shorter shank.

The longer shank is provided with a laterally offset portion 14 so as to prevent it from contacting with the body of the minnow. The longer shank extends beyond the shorter shank and the hook 15 of the longer shank extends oppositely to the hook 16 of the shorter shank and both hooks are located at opposite sides of the longitudinal center of the device.

The longer shank 10 with its offset portion constitutes the novelty of the invention. The shank extends in substantially a straight line from the eye or spring 12 and thence is bent outwardly at a point adjacent to the eye and from this bend is continued in a straight line to a point adjacent the hook 15 where it is bent inwardly, the straight portion of the shank between the bends being of sufficient length to form a guard for preventing escape of the minnow or other bait while at the same time it is sufficiently spaced at all times from the shorter shank 11 to positively eliminate any pressure upon the bait that would tend to crush the bait or disembowel the same and make it unfit for its purpose.

The longer shank is provided near the hook 15 with an integral latching hook 16 which extends toward the shorter shank 11 and is adapted to be hooked over the shorter shank to close the hook upon the minnow and prevent dislodgment of the minnow.

To bait the hook, the hook 16 of the shorter shank is placed in the minnow's mouth and the minnow is pushed onto the hook until the minnow's mouth is hooked over the barbs 13. The shank 10 is then fastened to the shorter shank 11 by placing the latching hook 16 over the shorter shank. This closes the fish hook upon the minnow so that the minnow cannot be dislodged during a cast or by a strike while at the same time the minnow is maintained in a natural position in the water to induce more strikes.

From the above description it is thought that the construction and operation of the invention will be fully understood without further explanation.

What is claimed is:

A fish hook comprising shanks terminating in barb hooks and of respectively different lengths, a spring eye connecting the shanks opposite the hooks, the shorter shank being adapted to have a minnow impaled longitudinally thereof, the longer shank extending in a straight line from said eye and at a point adjacent the eye being bent outwardly, thence from the bend extending in substantially a straight line to a point near the hook of the shank and at said point being bent inwardly, the shank between the bends being of sufficient length to prevent escape of the bait from the shorter shank but at the same time being permanently spaced laterally from the bait so as not to crush or disembowel the bait to render it unfit for use, and latching means carried by one of the shanks near the hook thereof and engageable with the other shank near the hook thereof to lock the shanks together.

JACK G. KASPICK.